UNITED STATES PATENT OFFICE.

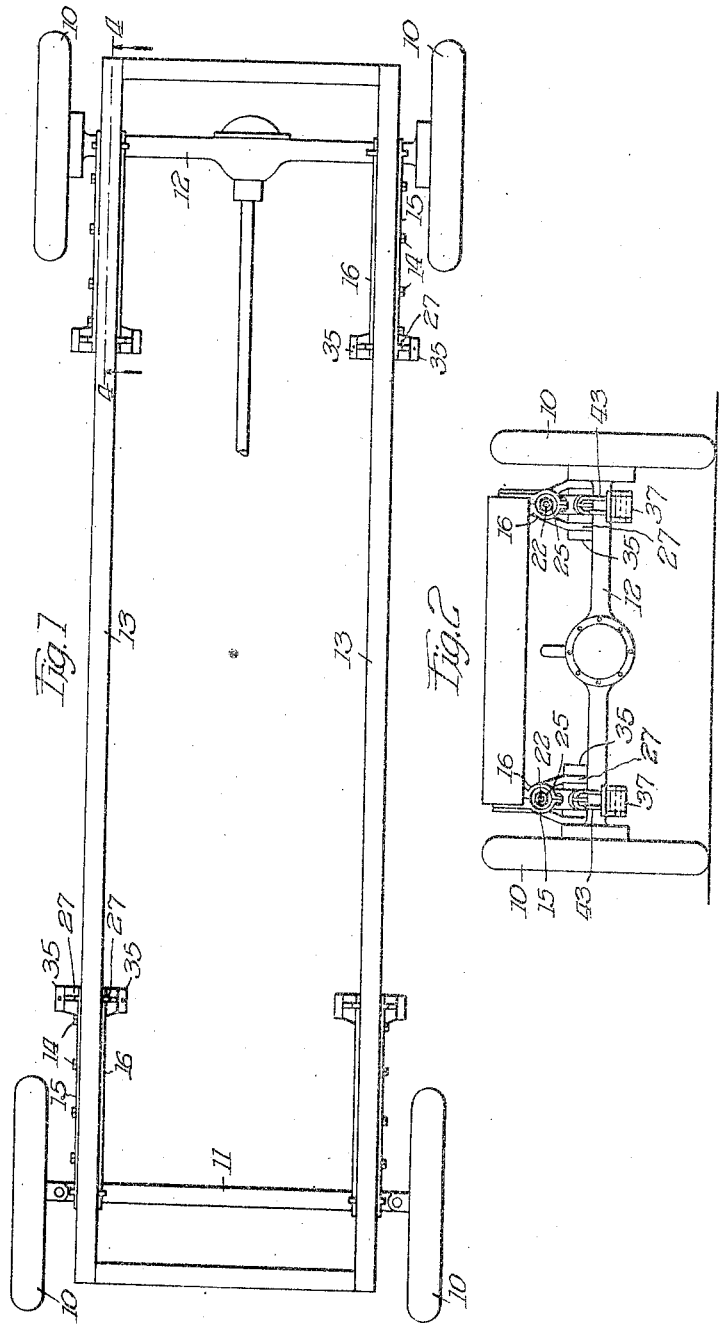

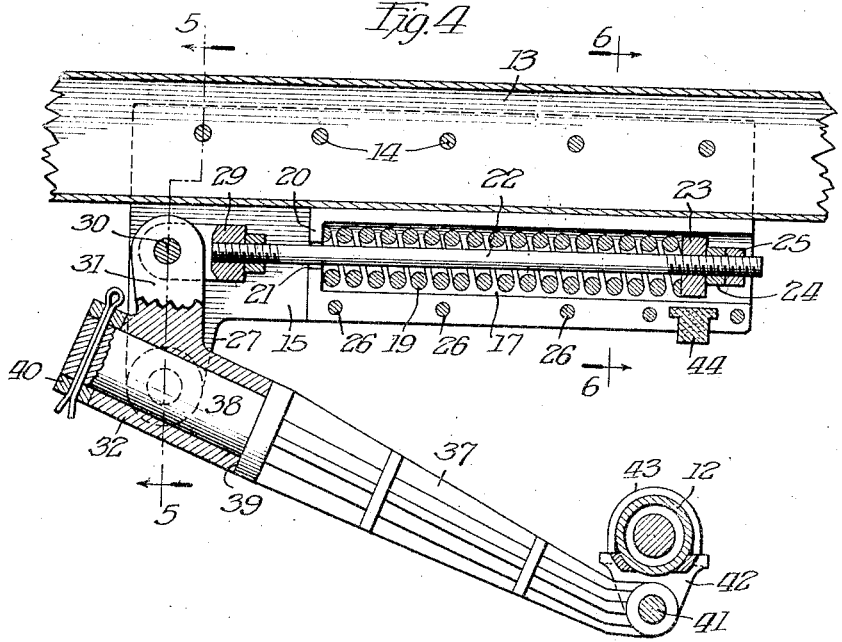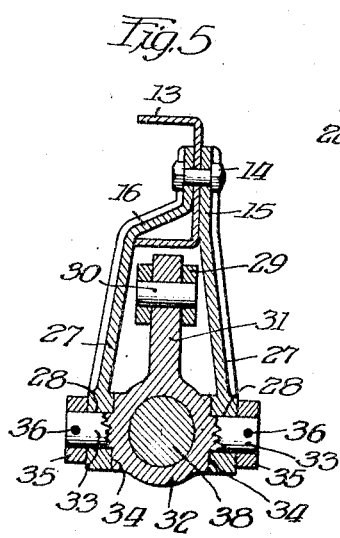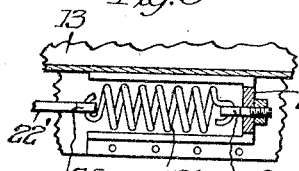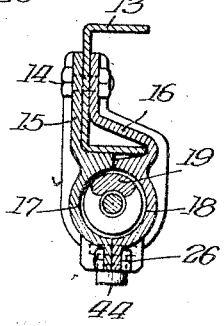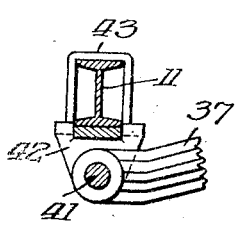

ALBERT HUPP, OF OAK PARK, ILLINOIS.

ANTIVIBRATION-SUPPORT FOR VEHICLE-BODIES.

1,367,660.   Specification of Letters Patent.   Patented Feb. 8, 1921.

Application filed June 3, 1918. Serial No. 237,871.

*To all whom it may concern:*

Be it known that I, ALBERT HUPP, a citizen of the United States, residing at Oak Park, in the county of Cook and State of Illinois, have invented certain new and useful Improvements in Antivibration - Supports for Vehicle-Bodies, of which the following is a specification.

This invention relates to a novel means of supporting a vehicle body on its running gear so as to absorb the shocks and vibrations due to rough roads or tracks that are, to a greater or less extent, transmitted to the vehicle body even when the most approved forms of springs and other known shock absorbers are employed. It is well known that the full and parti-elliptic springs commonly used on road vehicles, and the helical springs used alone or in association with the elliptic springs on railway cars do not prevent the transmission to the body of the vehicle or car of the vibrations of the running gear, but merely soften or cushion the shock and reduce the extent of movement. The main object of the present invention is to produce a yieldable support for a vehicle body on its running gear of such a character that the up-and-down vibrations of the latter shall be converted into an endwise contracting and expanding movement of the elastic element of the supporting means, with the reaction of said elastic element taking place in the direction of the length of the body, whereby up-and-down vibrations of the latter are avoided. Otherwise stated, the main purpose of this invention is the production of a device that shall allow the wheels that travel on the road surface to rise or fall under surface irregularities without this action of the wheels reaching the body of the vehicle.

In an earlier application filed by me on the 19th day of December, 1917, Serial No. 207,810, I have disclosed and broadly claimed a construction designed to effect the same general object or purpose as the present invention, and employing as the elastic shock-absorbing element a helical spring. The present invention differs therefrom chiefly in the employment of a spiral spring which is subjected to an endwise stress of either compression or extension in the direction of the length of the vehicle body.

The principle of this invention, its structural essentials, mode of operation, and advantages will be readily understood by those skilled in the art from the following description, taken in connection with the accompanying drawings wherein I have illustrated a practical and operative embodiment of the invention, and in which—

Figure 1 is a top plan view of an automobile chassis frame and running gear, with my invention applied thereto;

Fig. 2 is a rear end elevation of the same;

Fig. 3 is a side elevation of the same;

Fig. 4 is an enlarged sectional detail substantially on the line 4—4 of Fig. 1;

Figs. 5 and 6 are cross-sections on the corresponding lines of Fig. 4;

Fig. 7 is a detail view in cross-section through the front axle, showing the underslung attachment of one of the radius arms thereto; and Fig. 8 is a fragmentary view, similar to Fig. 4, illustrating an organization wherein the spring is under tension instead of compression.

Referring to the drawings, 10 designates the wheels, and 11 and 12 the forward and rear axles, respectively, of an automobile chassis or running gear, and 13 designates the usual channel side bars or sills that extend the full length of the chassis and constitute the immediate body-supporting elements of the structure. I have not herein shown the usual engine and line transmission of an automobile, partly because these features are not concerned with the present invention and would only tend to obscure the illustration of the latter, and partly because the invention may be applied to horse-drawn vehicles and, when so applied, may be used either with or without the usual reach connecting the front and rear axles.

In standard automobile practice the long body-supporting side bars 13 are commonly connected to the axles 11 and 12 through the intermediary of full or parti-elliptic springs. My present invention dispenses with these springs and substitutes what might be termed an auxiliary or sub-frame construction that consists chiefly of four independent spring and lever connections from the side bars 13 to the axles, two on each side of the vehicle. As these four connections are all alike, the front connections being merely reversed endwise relative to the rear connections, a description of one of the latter will suffice.

Strongly secured to the side bar 13, as by bolts or rivets 14, and depending therefrom is a bracket that serves the double function of a spring housing or casing and abutment and a fulcrum support for a lever that constitutes part of the transmission from the axle to the spring. This bracket is preferably, and as herein shown, made in two sections 15 and 16 (Figs. 5 and 6) that engage and depend from the outer and inner sides respectively of the side-bar 13; and these sections, which are preferably castings, are formed on their inner opposed sides with longitudinal semi-cylindrical chambers 17 and 18 that together form a cylindrical housing for a stout spiral compression spring 19. Each semi-cylindrical chamber has a transverse wall 20 (Fig. 4) at one end; the two end walls forming an abutment for one end of the spring 19, and formed with a central hole 21 to accommodate the passage of a rod 22 that extends axially through the spring and is equipped at one end with an abutment washer 23 and a nut 24 and lock-nut 25. The bracket sections 15 and 16 are preferably united along their lower edges by bolts or rivets 26, and at their inner ends are formed with depending short arms or lugs 27 (Figs. 4 and 5) the lower ends of which are apertured to form bearings 28. The inner end of rod 22 is articulated by a link coupling 29 and pivot-pin 30 to an upstanding arm 31 formed on and preferably integral with a tubular piece or sleeve 32, which latter is equipped with laterally extending trunnions 33 that are supported in the bearings 28. Shoulders 34 on the sleeve 32 engaging the inner faces of the bearings 28, and washers 35 on the outer ends of the trunnions secured by cotter-pins 36, serve to confine the trunnions securely in their bearings against end play.

37 designates a radius arm, the inner end of which is formed as a rounded stem or shank 38 that snugly fits the bore of the sleeve 32. An annular shoulder 39 at the base of the shank abutting against one end of sleeve 32, and a washer 40 on the other end of the shank abutting against the other end of sleeve 32, serve to confine said shank endwise in said sleeve.

The outer end of radius arm 37 is articulated by a pivot pin 41 to a bracket 42 secured by clips or clamps 43 to the under side of the axle 11 or 12. In the lower side of the spring housing or casing is set a bumper 44 of rubber or like yielding material in a position to be struck by the axle under unusual and abnormal vibrations of the latter, such as might be caused by deep holes or ruts or high obstructions in the road.

The device operates on the following principle. When a wheel encounters an obstruction in the road, such as a stone, which causes it to rise in order to surmount the obstacle, there is, of course, a substantially vertical upward movement of the axle relatively to the vehicle body to an extent depending upon the height of the obstruction. This causes the radius arm 37 which is nearest the wheel encountering the obstruction to swing upwardly on the axis of the trunnions 36 as a pivot. This in turn rocks the sleeve 32 and arm 31, the latter swinging to the left in Fig. 4, and, through the link connections to the outer end of spring 19, placing the latter in compression. The thrust of the spring is resisted by the abutment wall 20 of the housing; but since this thrust is in a direction and along a line parallel with the side-bar 13 and the length of the vehicle body, there is no upward thrust on the latter. It will be observed that in this construction the radius arm 37, sleeve 32 and arm 31 constitute in effect a bell-crank lever intermediate the axle and the spring, while the rod 22 and its coupling 29 constitute a tension link between the bell-crank lever and the spring. When the axle drops, as when the wheel encounters a hole or rut, the elbow lever swings in the opposite direction, permitting an expanding movement of the spring 19. From the foregoing it will readily be seen that the up-and-down vibrations of the axles are, through the body-supporting mechanism shown and described, converted into contracting and expanding movements of the spring 19 in a direction parallel to the length of the chassis frame, whence it follows that the thrust of the spring does not impart any vertical vibration to the vehicle body. It will be evident moreover, that lateral shocks on the wheels in the direction of travel caused by obstructions on the road surface produce the same rocking or swinging of the elbow levers on these trunnions 33 as are caused by substantially vertical shocks and are likewise absorbed by the springs in the same manner. Hence the vehicle, equipped with the present invention, will surmount road obstacles more easily and will ride more smoothly and require less power for its propulsion on rough roads than vehicles equipped with known styles of springs and other shock absorbers.

In Fig. 8 I have illustrated a slightly different organization wherein the spring, instead of being under compression, is under tension. In this construction the rod 22', instead of extending through the spring 19', is connected to the inner end of the latter, as indicated at 45, and the outer end of the spring is anchored at 46 to an outer transverse wall 20' of the spring housing. In this case also the pull of the spring 19' is in a direction parallel to the length of the body supporting element.

While it is contemplated that the invention will be applied chiefly to automobiles and other motor vehicles, not only to take the place of the usual supporting springs and shock absorbers but also to dispense with the necessity of pneumatic tires and rubber generally, yet it will be manifest that the invention is equally applicable and adaptable to street cars, railway cars, and horse-drawn vehicles, and, when embodied in the latter, enables the usual reach between the front and rear axles to be dispensed with, since the front and rear axles are connected through the brackets, springs, links and levers, as is clear from Fig. 3.

One of the principal advantages of the present invention lies in the fact that it does away with the necessity of pneumatic tires with all the inconveniences and delays caused by punctures, blow-outs and the like. In fact, it obviates the necessity of cushion tires of any sort, although solid rubber tires or hollow tires stuffed with any of the known "fillers" now on the market will preferably be employed in order to cushion the wheels and axles themselves and the connections between the axles and the chassis frame, and to eliminate noise.

Another advantage of the invention lies in the fact that it can readily be applied to most of the known makes of automobiles by simply removing the present springs by which the chassis frame is supported on the axles and substituting the supporting devices herein shown and described. The invention has an element of safety, because, if a spring should break, the worst that could happen would be a settling of the chassis frame at that side down on to the axle, since the frame and axle are locked together lengthwise by the brackets and radius arms, independently of the presence or absence of a reach between the axles. The adjustable engagement of the outer end of the link rod 22 with the spring 19, by means of the nuts 24 and 25 engaging a threaded end of said rod, is of importance, since it not only enables the tension of the springs to be regulated as desired, but also, in case one side or corner of the vehicle body should drop or sag, enables such defect to be readily cured and the vehicle body leveled by merely turning up the nuts on said side or corner thereby stiffening the spring or springs.

My invention is of especial value and utility on army and other ambulances and like vehicles, intended for the transportation of the sick and wounded, in that it entirely eliminates the jolting and bouncing that not only causes intense suffering but is often fatal to the severely wounded.

Believing the invention to be radically novel in the principle of converting the up and down vibrations of the wheels into spring-cushioned thrusts upon the body or chassis frame lengthwise of the latter and thereby obviating the transmission of such up and down vibrations to the body of the vehicle, I do not limit the invention to the particular embodiments herein disclosed for purposes of illustration, but reserve all such modifications, variations and mechanical equivalents as fall within the scope and purview of the appended claims.

I claim:

1. In a vehicle the combination with an axle of a side bar for supporting the vehicle body, a bracket formed of two longitudinally extending plate-like sections secured along their upper edges to opposite sides of said side bar but extending downwardly and forming between them below the side bar a tubular housing throughout most of their length and having alined transverse bearing openings beyond the end of said housing, a coiled spring in said housing, an elbow lever fulcrumed in said bearing openings, and having one arm connected to the axle and a link pivoted to the other arm and connecting it to said spring.

2. In a vehicle, the combination with an axle of a side bar for supporting the vehicle body, a bracket formed of two longitudinally extending plate-like sections secured along their upper edges to opposite sides of said side bar but extending downwardly and forming between them below the side bar a tubular housing throughout most of their length and having alined transverse bearing openings beyond the end of said housing and a transverse abutment at the end of said housing next to said bearings, a coiled spring in said housing bearing at one end on said abutment, an elbow lever fulcrumed in said bearing openings having the end of one arm connected to the axle, and a link pivoted to the end of the other arm and extending through said abutment and said coiled spring and having means at its outer end to engage the end of said coiled spring.

ALBERT HUPP.